G. W. Lockhart,
Hay Press.
No. 76,478.      Patented Apr. 7, 1868.
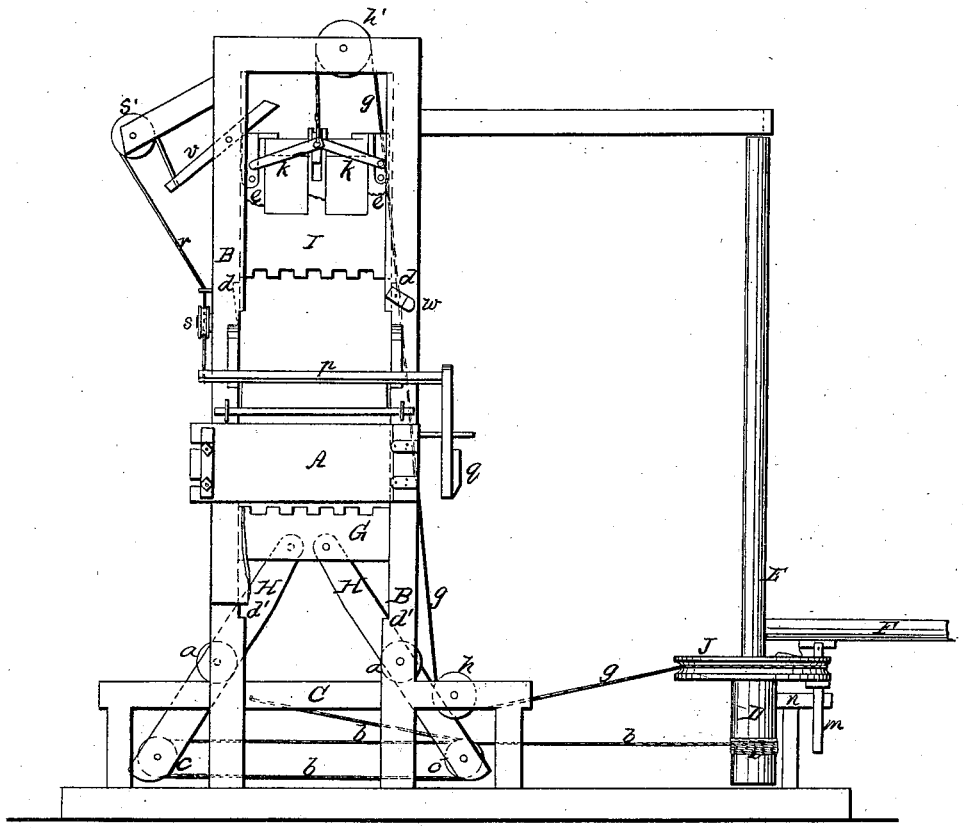
Witnesses.
Theo Inseke
Wm Trewin
Inventor
G W Lockhart
Per Munn & Co
Attorneys

United States Patent Office.

G. W. LOCKHART, OF CHARLESTOWN, INDIANA.

Letters Patent No. 76,478, dated April 7, 1868.

---

IMPROVED HAY-PRESS.

---

*The Schedule referred to in these Letters Patent and making part of the same.*

---

TO ALL WHOM IT MAY CONCERN:

Be it known that I, G. W. LOCKHART, of Charlestown, in the county of Clark, and State of Indiana, have invented a new and useful Improvement in Hay-Press; and I do hereby declare that the following is a full, clear, and exact description thereof, which will enable others skilled in the art to make and use the same, reference being had to the accompanying drawings, forming part of this specification.

The drawing represents a side view of my improved beater-press, the beater-drop being in section to show its interior arrangement.

This invention relates to improvements in the construction of a beater hay-press, and consists in the arrangement of a drop-beater in connection with a horse-power, and operated by means of a rope and pulleys, and also a press-block or follower, worked upwards by means of toggle-bars, that travel on friction-rollers upon a platform, and are operated by a drum on the horse-power shaft with rope and pulleys. This press is easily and cheaply made, and operates with great power and dispatch.

A is the bale-chest, in a vertical frame, B, at the lower part of which is a long platform, C, in line with the drum D, on the horse-power shaft E, turned by the sweep F. G is the lower press-head or follower, in the bale-chest A. The follower G is pivoted to two toggle-bars or spread legs H H, which are set within the framing B and the platform C, in such manner that as they close together, they raise the follower G, and as they open, they lower it in the bale-chest, which movement is accomplished by means of friction-wheels or rollers $a$ $a$, on each toggle-bar, resting on the platform C, upon which they roll back and forth when the toggle-bars are moved to raise or lower the press-follower G, by means of the cord $b$, that passes from the drum D over the pulleys $c$ $c'$, in the ends of the toggle-bars H H, as shown clearly in the drawing. When the rope $b$ is wound upon the drum D, the toggle-bars H H are drawn together, and the press-follower G ascends in the bale-chest A, to compress the hay against the upper follower or beater I, which is held in place to resist the pressure, by catching against shoulders $d$ $d$ in the frame B, by means of wing-blocks $e$ $e$, as hereinafter explained. But when the rope $b$ is unwound from the drum D, the lower follower G rests upon shoulders $d'$ $d'$, to resist the pounding of the beater I when it drops to pack the hay. The rope $b$ is hooked and unhooked as required. The beater I is connected with a horizontal hoist-wheel, J, on the horse-power shaft E, by a hoisting-rope, $g$, that passes under a pulley, $h$, at the lower part of the press, and over a pulley, $h'$, at the top of the press, which rope $g$ is fastened to spread arms $k$ $k$, on the ends of which are the wing-blocks $e$ $e$, that are drawn inward within the frame B, when the follower is hoisted by the rope, by the closing of the arms $k$ $k$, and fall outward to catch against the shoulders $d$ $d$, when the rope $g$ is relaxed, and the beater rises under the pressure of the lower follower G upwards. The hoist-wheel J is loose upon the power-shaft E, and in order to operate, is made to turn in one direction with the shaft, by means of a catch-bar, $m$, that engages the sweep F by its own weight, keeping it in a perpendicular position until it is disengaged by a cam-block, $n$, in order to let the beater drop. The catch-bar $m$ may also be hooked up out of the way, for the operation of the shaft to compress the hay with the lower press-follower. The bale-chest A is provided with side doors, as usual, and one side is a flap-door, $p$, which is opened by means of a side-weight, $q$, to put hay in the press, and is closed by means of a rope, $r$, passing under the pulley $s$, and over the pulley $s'$, to a pivot-bar, $v$, which is forced outward to close the door by the beater when it rises. The flap-door $p$ may be fastened up by a button, $w$.

The operation of the press is obvious.

Having thus described my invention, what I claim as new, and desire to secure by Letters Patent, is—

The levers H H pivoted to the follower G, when provided with the fulcrum-rollers $a$ $a$, at about the centre of their lengths, adapted to travel upon the horizontal platform $c$, while their lower ends bearing the pulleys $c$, are below said platform, all operating as described, for the purpose specified.

The above specification of my invention signed by me, this 9th day of February, 1867.

G. W. LOCKHART.

Witnesses:
   D. BRIDGES,
   J. B. CLAPP.